United States Patent [19]
Morita

[11] Patent Number: 5,231,897
[45] Date of Patent: * Aug. 3, 1993

[54] AUTOMOTIC TRANSMISSION CONTROL APPARATUS

[75] Inventor: Shigeki Morita, Himeji, Japan

[73] Assignee: Mitsubishi Denki K.K., Tokyo, Japan

[*] Notice: The portion of the term of this patent subsequent to Jul. 30, 2008 has been disclaimed.

[21] Appl. No.: 684,729

[22] Filed: Apr. 15, 1991

[30] Foreign Application Priority Data

Apr. 17, 1990 [JP] Japan .................................. 2-102063
Apr. 23, 1990 [JP] Japan .................................. 2-107921

[51] Int. Cl.⁵ .............................................. B60K 41/18
[52] U.S. Cl. .................................. 74/866; 364/424.1
[58] Field of Search ....................... 74/866; 364/424.1

[56] References Cited

U.S. PATENT DOCUMENTS

| | | | |
|---|---|---|---|
| 3,640,156 | 2/1972 | Mori et al. | 74/866 |
| 3,684,066 | 8/1972 | Kubo et al. | 74/866 X |
| 3,702,572 | 11/1972 | Wakamatsu et al. | 74/866 |
| 3,713,351 | 1/1973 | Sakakibara et al. | 74/866 X |
| 3,732,755 | 5/1973 | Beig et al. | 74/866 |
| 3,881,368 | 5/1975 | Furuhashi et al. | 74/866 |
| 4,350,234 | 9/1982 | Suga et al. | 74/866 X |
| 4,471,437 | 9/1984 | Yoshino et al. | 364/424.1 |
| 4,648,291 | 3/1987 | Klatt et al. | 74/866 |
| 4,713,764 | 12/1987 | Klatt | 74/866 X |
| 4,823,646 | 4/1989 | Yoshimura et al. | 74/866 |
| 4,841,815 | 6/1989 | Takahashi | 74/866 |
| 4,854,194 | 8/1989 | Kaneko et al. | 74/866 |
| 4,930,374 | 6/1990 | Simonyi et al. | 74/866 |
| 5,035,160 | 7/1991 | Morita | 74/866 |

FOREIGN PATENT DOCUMENTS

| | | |
|---|---|---|
| 2001941 | 2/1976 | Fed. Rep. of Germany . |
| 1954757 | 8/1977 | Fed. Rep. of Germany . |
| 2852195 | 8/1987 | Fed. Rep. of Germany . |

OTHER PUBLICATIONS

English-Language Official Action of the German Patent Office.

Primary Examiner—Rodney H. Bonck
Assistant Examiner—Ryan W. Massey
Attorney, Agent, or Firm—Sughrue, Mion, Zinn, Macpeak & Seas

[57] ABSTRACT

A control apparatus for an automatic transmission calculates the running resistance of a vehicle based on the vehicle acceleration and the torque generated by the engine. When the running resistance exceeds a first prescribed value, it is determined that the vehicle is travelling on an uphill slope on which upshifting should not take place, so the transmission is prevented from upshifting. When the running resistance falls below a second prescribed value, it is determined that the vehicle is travelling on a downhill slope, so the transmission is made to downshift to a gear in which the engine of the vehicle will perform engine braking. When the running resistance is between the first and second prescribed values, the control apparatus controls the transmission based on the vehicle speed and the throttle opening.

19 Claims, 6 Drawing Sheets

AUTOMOTIC TRANSMISSION CONTROL APPARATUS

BACKGROUND OF THE INVENTION

This invention relates to a control apparatus for an automatic transmission of an automotive vehicle. More particularly, it relates to a control apparatus which can improve the performance of an automatic transmission when the vehicle is ascending or descending a hill, thereby increasing the safety and comfort of the vehicle.

The gear setting of a conventional automatic transmission for an automotive vehicle is controlled in accordance with the engine load, as indicated by the degree of opening of the throttle valve, and the vehicle speed. While this manner of control is satisfactory under many driving conditions, it can cause problems when the vehicle is travelling on a hill.

For example, when a vehicle is entering a curve in a road on an uphill slope, the driver of the vehicle may decide to let up on the accelerator pedal in order to decrease the vehicle speed. As a result of his doing so, the throttle valve opening will decrease, and this decrease may cause a conventional transmission control apparatus to control the transmission so as to shift up into a gear which is unsuitable for hill climbing, and the vehicle will have difficulty ascending the slope. In addition, the driver experiences an unpleasant sensation when the transmission upshifts contrary to his expectations. When the vehicle is coming out of the same uphill curve in the road and the driver increases the depression of the accelerator pedal in order to again increase the vehicle speed, since the transmission is in too high a gear, the vehicle can not be accelerated as quickly as desired. In this case, the increase in the throttle valve opening when the driver depresses the accelerator pedal as he comes out of the curve may cause the transmission to shift down into a lower gear for acceleration. The downshifting by the transmission produces a sudden change in the torque applied to the drive wheels, and this sudden change greatly decreases the stability of the vehicle.

A conventional transmission control apparatus also produces problems when a vehicle is travelling downhill. The transmission of a vehicle may be in high gear when it starts to enter a downhill slope. Unless the driver manually downshifts the transmission, it will remain in high gear, and the engine will tend to accelerate the vehicle. On a long slope, it is preferable to downshift the transmission to a gear in which the engine is performing engine braking, which refers to a state in which the engine is actually braking the vehicle rather than driving it. However, many drivers of vehicles equipped with automatic transmissions have a tendency not to perform any manual shifting and leave the transmission in the Drive setting under all forward driving conditions. Such drivers rely totally on the brakes to decelerate the vehicle on downhill slopes, but on very long slopes, prolonged and continuous use of the brakes may cause the brakes to overheat and fail.

SUMMARY OF THE INVENTION

Accordingly, it is an object of the present invention to provide a control apparatus for an automatic transmission of an automotive vehicle which can prevent the transmission from upshifting to an unsuitable gear when the vehicle is travelling on an uphill slope.

It is another object of the present invention to provide a control apparatus for an automatic transmission which can automatically perform engine braking of a vehicle travelling on a downhill slope.

It is still another object of the present invention to provide a control apparatus for an automatic transmission for an automotive vehicle which can increase the safety and riding comfort of the vehicle.

It is yet another object of the present invention to provide a control apparatus for an automatic transmission which can be applied to existing automatic transmissions.

A control apparatus for an automatic transmission according to the present invention calculates the running resistance of a vehicle based on the vehicle acceleration and the torque generated by the engine. In one form of the present invention, when the running resistance exceeds a first prescribed value, the control apparatus determines that the vehicle is travelling on an uphill slope on which upshifting should not take place, so the transmission is prevented from upshifting. In another form of the present invention, when the running resistance falls below a second prescribed value, the control apparatus determines that the vehicle is travelling on a downhill slope, so the transmission is made to downshift to a gear in which the engine will perform engine braking. When the running resistance is between the first and second prescribed values, the control apparatus controls the transmission based on the vehicle speed and the throttle opening in a conventional manner.

Since the control apparatus prevents a transmission from upshifting to an inappropriate gear on an uphill slope, the hill climbing performance of the vehicle is improved, and since the transmission does not upshift unexpectedly, the comfort of the ride is improved. Further, a sudden change in drive force due to sudden upshifting or downshifting on a curve is prevented, so the stability and safety of the vehicle are increased. On a downhill slope, the control apparatus can automatically control the transmission so as to carry out engine braking, so the driver of the vehicle does not need to apply the brakes, and the danger of brake failure due to overheating from prolonged use on a downhill slope can be eliminated.

DESCRIPTION OF THE PREFERRED EMBODIMENTS

Figure 1:
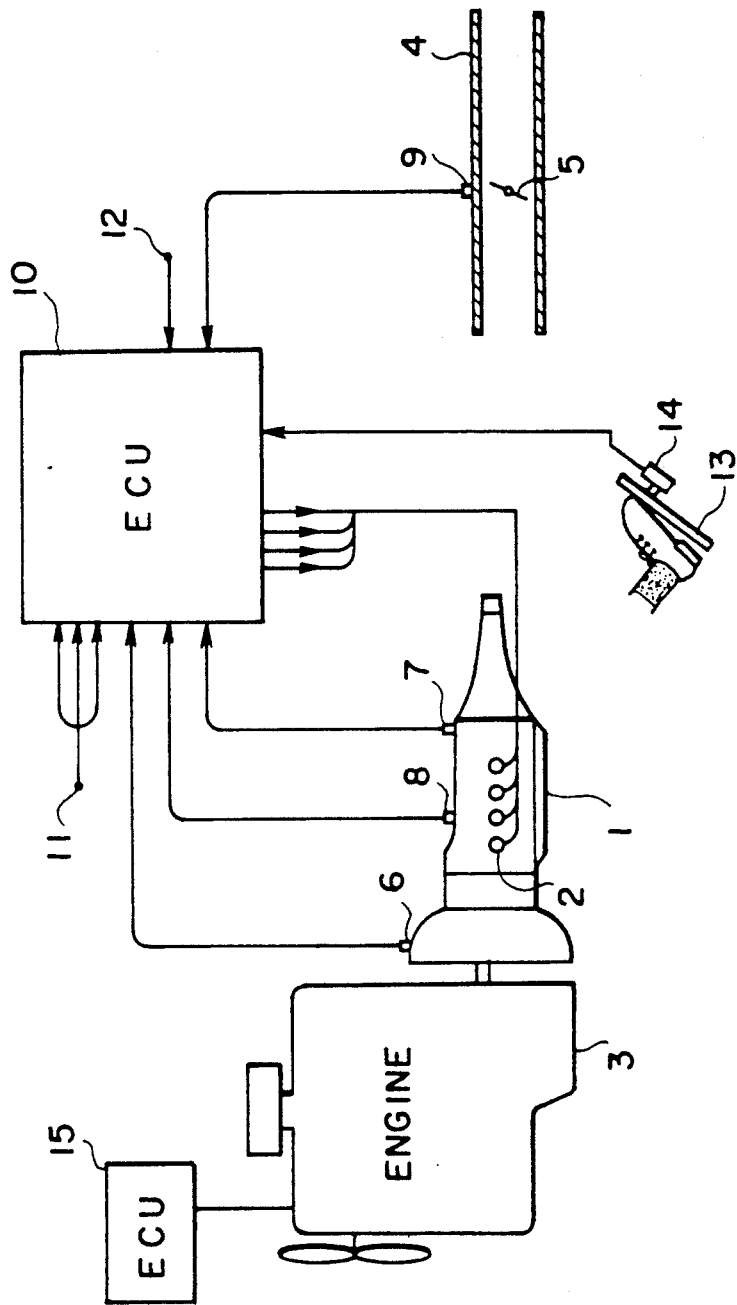
FIG. 1 is a block diagram of an embodiment of a transmission control apparatus according to the present invention.

A preferred embodiment of a transmission control apparatus according to the present invention will now be described while referring to the accompanying drawings, FIG. 1 of which is a block diagram of this embodiment as applied to a conventional automatic transmission 1. The transmission 1 is of the type having a torque converter drivingly connected to a gear box, both of which are actuated by a hydraulic fluid controlled by solenoid valves 2. The transmission 1 is driven by an engine 3, which may be equipped with a conventional electronic control unit (ECU) 15 for controlling the ignition timing and fuel supply of the engine 3. An engine rotation sensor 6 mounted on the transmission 1 detects the rotation of the input shaft of the transmission 1 and generates a corresponding electrical output signal which indicates the engine rotational speed. A vehicle speed sensor 7 detects the rotation of the output shaft of the transmission 1 and generates a corresponding output signal which corresponds to the vehicle speed. The output signals from sensors 6 and 7 are input to an electronic control unit (ECU) 10 for the transmission.

An inhibitor switch 8 which is mounted on the transmission 1 senses when the transmission 1 is in the Neutral or Park position and sends a corresponding output signal to the transmission ECU 10.

A throttle valve 5 which is opened and closed in response to movement of an unillustrated accelerator pedal is pivotally mounted in a suction pipe 4 for the engine 3. A throttle opening sensor 9 mounted on the suction pipe 4 senses the degree of opening of the throttle valve 5 and provides the transmission ECU 10 with a corresponding input signal.

The transmission ECU 10 receives a speed range signal 11 from a selector mechanism which indicates the position (1, 2, Drive, etc.) to which the driver of the vehicle has set an unillustrated gear shift lever of the vehicle. The transmission ECU 10 also receives an ignition signal 12 from an unillustrated ignition switch.

The transmission ECU 10 selects the gear at which the transmission 1 is to operate based on the vehicle speed and the throttle opening as indicated by the input signals from the vehicle speed sensor 7 and the throttle opening sensor 9, respectively, and controls the operation of the solenoid valves 2 so that the transmission 1 runs in the selected gear. Furthermore, the transmission ECU 10 calculates the running resistance of the vehicle based on the torque generated by the engine and the vehicle acceleration. In a first mode of operation, when the running resistance is greater than a first prescribed value, the transmission ECU 10 fixes the transmission in its present gear and prevents it from upshifting. In a second mode of operation, when the running resistance is less than a second prescribed value, the transmission ECU 10 controls the transmission 1 so as to downshift to a gear in which engine braking is performed.

Figure 2:
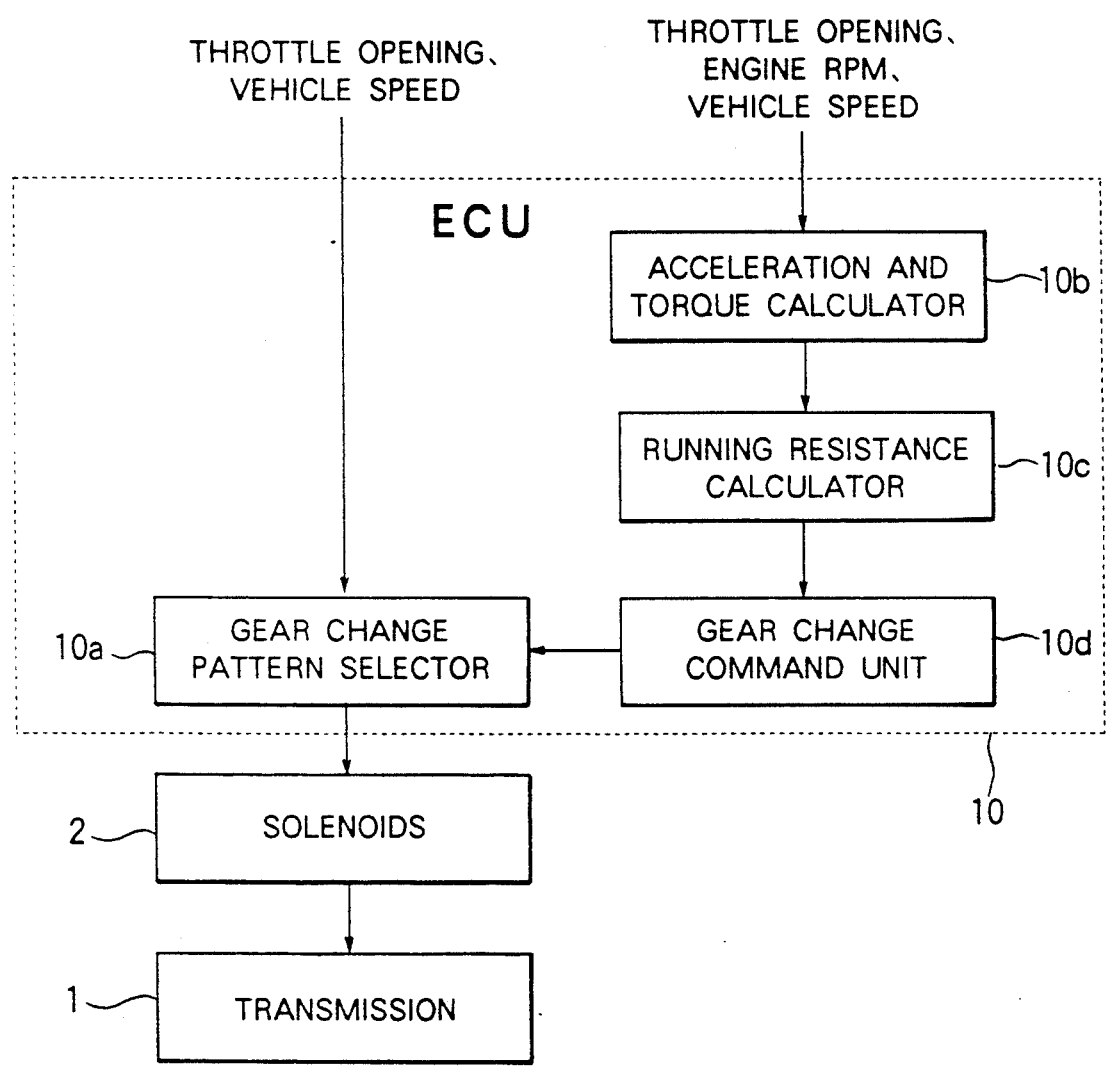
FIG. 2 is a block diagram conceptually illustrating the structure of the transmission ECU of FIG. 1.

FIG. 2 conceptually illustrates the structure of the transmission ECU 10. It includes a gear change pattern selector 10a which receives the input signals from the vehicle speed sensor 7 and the throttle opening sensor 9 and selects a suitable gear change pattern based on the vehicle speed and the throttle opening. The gear change pattern selector 10a may include a memory containing a memory table in which are stored a plurality of gear change patterns corresponding to different values of the vehicle speed and throttle opening, and the gear change pattern selector 10a can determine the appropriate gear change pattern by a table look-up operation using the vehicle speed and throttle opening as input variables. An acceleration and torque calculator 10b receives the input signals from the engine rotation sensor 6, the vehicle speed sensor 7, and the throttle opening sensor 9 and calculates the acceleration of the vehicle and the torque being generated by the engine 3. The vehicle acceleration can be calculated from the time rate of change of the vehicle speed as indicated by the vehicle speed sensor 7. The engine torque is experimentally determined from the engine rotational speed indicated by the engine rotation sensor 6 and the throttle opening indicated by the throttle opening sensor 9. The engine torque can be determined by use of a memory table in an unillustrated memory of the transmission ECU 10 in which the relationship of the engine torque to the engine rotational speed and the throttle opening is stored. Based on the vehicle acceleration and engine torque calculated by the calculator 10b, a running resistance calculator 10c calculates the running resistance of the vehicle. Running resistance here refers to the total resistance to movement by the vehicle. The calculated running resistance is then provided to a gear change command unit 10d which generates auxiliary commands which can override the gear change pattern selected by the gear change pattern selector 10a. When the running resistance is greater than a first prescribed value, the gear change command unit 10d determines that the vehicle is running uphill, so it generates a command to the gear change pattern selector 10a to fix the transmission 1 in its present gear and prevent the transmission 1 from shifting to a higher gear than the present gear. On the other hand, when the gear change command unit 10d determines that the running resistance is less than a second prescribed value, it determines that the vehicle is running downhill, so it generates a command to the gear change pattern selector 10a to make the transmission 1 shift down to a lower gear in which engine braking is performed.

Electronic control units equipped with gear change pattern selectors which automatically select a gear change pattern for an automatic transmission based on throttle opening and vehicle speed are well known to those skilled in the art. The transmission ECU 10 of FIG. 2 differs from a conventional transmission ECU by the provision of elements 10b–10d in addition to the gear change pattern selector 10a. Elements 10a–10d of the transmission ECU 10 can be separate electrical components, or they can comprise a microcomputer or the like which performs the above-described functions of these elements by executing a program. It is also possible to incorporate the transmission ECU 10 into the engine ECU 15.

If the engine ECU 15 is of the type which, as part of its normal operation, calculates the engine torque based on engine operating conditions such as the air intake rate into the engine 3, it is not necessary for the transmission ECU 10 to separately calculate the engine torque. In this case, the torque calculated by the engine ECU 15 can be provided to the transmission ECU 10 as an input signal, resulting in a simplification of the transmission ECU 10.

Figure 3:
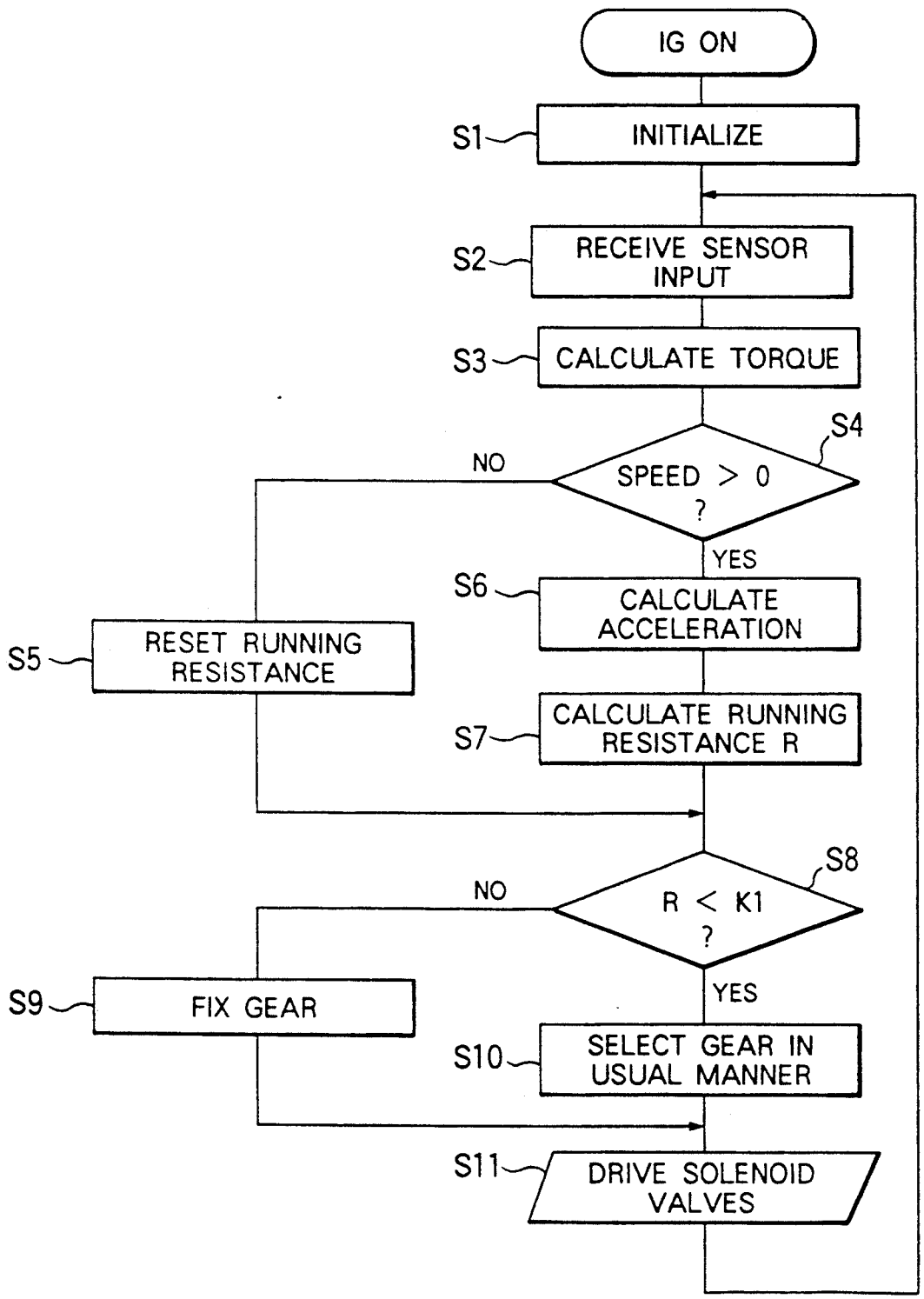
FIG. 3 is a flow chart illustrating one mode of operation of the embodiment of FIG. 1.

FIG. 3 is a flow chart illustrating the first mode of operation of the embodiment of FIG. 1. Processing starts when the ignition switch is turned on. In Step S1, the transmission ECU 10 is initialized, after which a loop comprising Steps S2 through S11 is commenced.

In Step S2, the transmission ECU 10 reads in information from the various sensors 6-9 and receives input signals 11 and 12. In Step S3, based on the throttle opening sensed by the throttle opening sensor 9 and the engine rotational speed indicated by the output signal from the engine rotation sensor 6, the acceleration and torque calculator 10b calculates the engine torque, as well known in the art.

In Step S4, the transmission ECU 10 determines whether the vehicle speed as indicated by the vehicle speed sensor 7 is greater than 0. If the vehicle speed is 0, in Step S5, the running resistance is reset to a value corresponding to running conditions on a flat road, which is intrinsic to the vehicle, and Step S8 is proceeded to. On the other hand, if the vehicle speed is greater than 0, then in Step S6 the acceleration and torque calculator 10b calculates the vehicle acceleration based on the signal from the vehicle speed sensor 7. Next, in Step S7, the running resistance calculator 10c calculates the running resistance of the vehicle. An example of an equation that can be used to calculate the running resistance R is $$R = (T \times G \times 1/r) - \alpha \times m \quad (1)$$

wherein T is the engine torque calculated in Step S3, G is the gear ratio of the transmission 1, r is the radius of the tires on the drive wheels of the vehicle, $\alpha$ is the vehicle acceleration calculated in Step S6, and m is the vehicle mass.

In Step S8, the gear change command unit 10d compares the calculated running resistance R with a first prescribed value K1 which is determined by the present gear setting of the transmission 1. If the running resistance R is smaller than the first prescribed value K1, the gear change command unit 10d determines that it is not necessary to inhibit upshifting by the transmission 1, so in Step S10 the gear change pattern selector 10a controls the solenoid valves 2 of the transmission in the usual manner based on the throttle opening and the vehicle speed.

On the other hand, if in Step S8 the running resistance R is greater than the first prescribed value K1, the gear change command unit 10d determines that the vehicle is travelling on an uphill slope, so in Step S9, the gear change command unit 10d generates a command to the gear change pattern selector 10a to fix the transmission 1 in its present gear, thereby preventing the transmission 1 from upshifting into a gear in which hill climbing is impossible.

In Step S11, the solenoid valves 2 are driven by the gear change pattern selector 10a to operate the transmission 1 according to the gear change pattern selected by the gear change pattern selector 10a, after which Step S2 is returned to.

It can be seen that in the mode of operation illustrated in FIG. 3, the transmission 1 is automatically prevented from shifting up to a higher gear than the present gear when the vehicle is climbing a hill of more than a certain grade. As a result, even if the driver lets up on the accelerator pedal on an uphill slope in order to reduce the vehicle speed, such as when entering a curve, the transmission 1 is prevented from shifting into a gear in which hill climbing becomes impossible, and when the driver again increases the depression of the accelerator pedal, the vehicle will immediately accelerate. Therefore, not only is the hill climbing performance of the vehicle improved, but the safety of the vehicle is increased since the wheels will not undergo a sudden change in drive force on a curve due to sudden shifting or downshifting by the transmission. Furthermore, because the transmission 1 is prevented from unexpectedly upshifting on a hill, the comfort of the ride experienced by the passengers of the vehicle is increased.

In Step S9 of FIG. 3, the gear change command unit 10d issues a command to the gear change pattern selector 10a to fix the transmission 1 in its present gear. Alternatively, the gear change command unit 10d can be made to issue a command which permits downshifting but prevents upshifting by the transmission 1.

Figure 4:
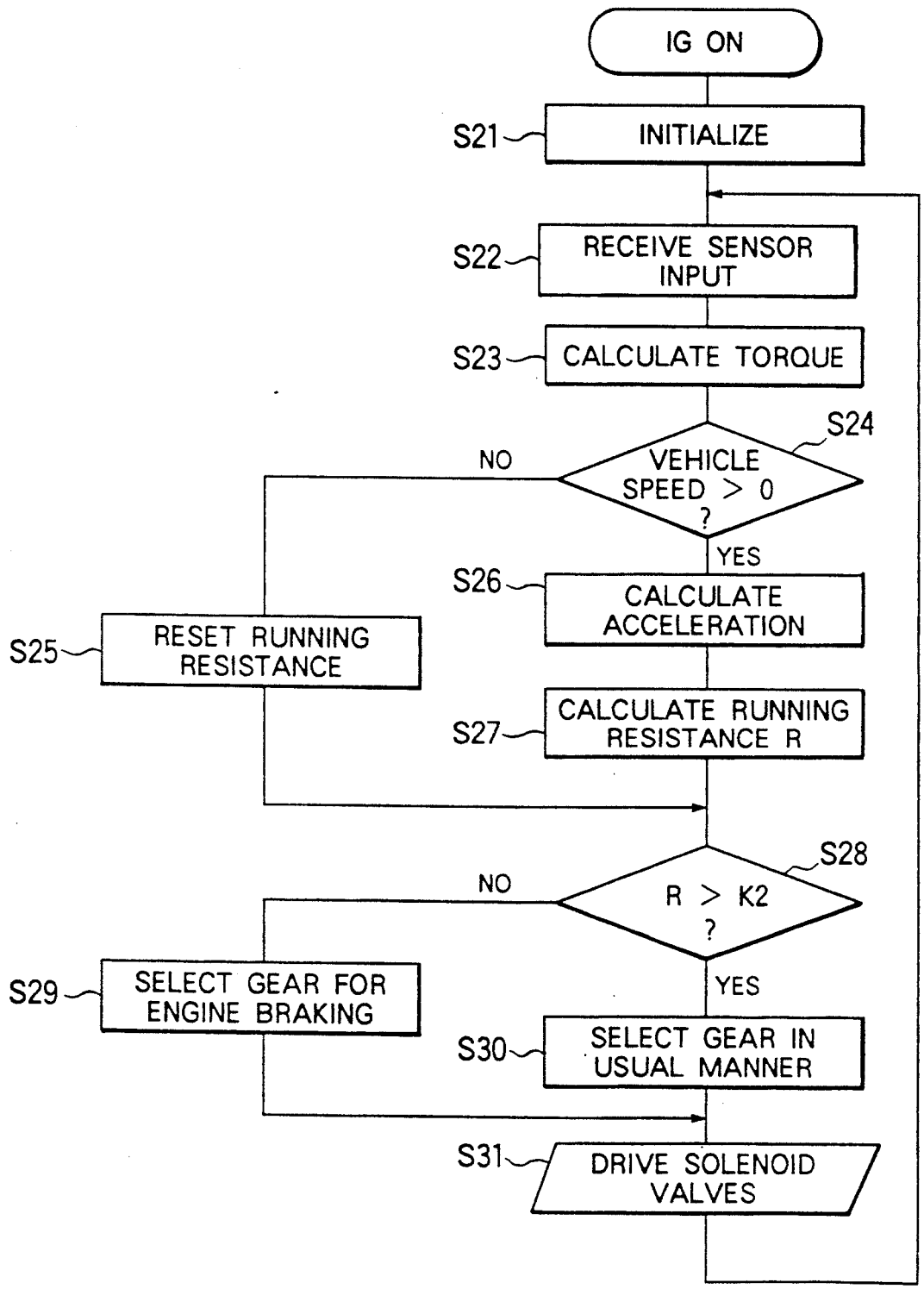
FIG. 4 is a flow chart illustrating another mode of operation of the embodiment of FIG. 1.

FIG. 4 is a flow chart illustrating another mode of operation of the embodiment of FIG. 1 in which the transmission ECU 10 controls the transmission 1 so as to downshift and thereby perform engine braking when the vehicle is travelling downhill. The overall flow of operations is similar to that in the operating mode illustrated in FIG. 3, and Steps S21-S27 of FIG. 4 are identical to Steps S1-S7, respectively, of FIG. 3. Therefore, the operating mode illustrated in FIG. 4 will be explained beginning with Step S28. In this step, the running resistance calculated by the running resistance calculator 10c in Step S27 is compared with a second prescribed value K2 based on the gear in which the transmission 1 is presently running. When the vehicle is running downhill, the running resistance given by Equation (1) is negative, so the second prescribed value K2 is usually a negative number. If the running resistance is greater than the second prescribed value K2, then it is determined that it is not necessary to perform engine braking, so in Step S30 the gear change pattern selector 10a selects a gear change pattern for the transmission 1 in the usual manner based on the throttle opening and the vehicle speed.

Figure 5:
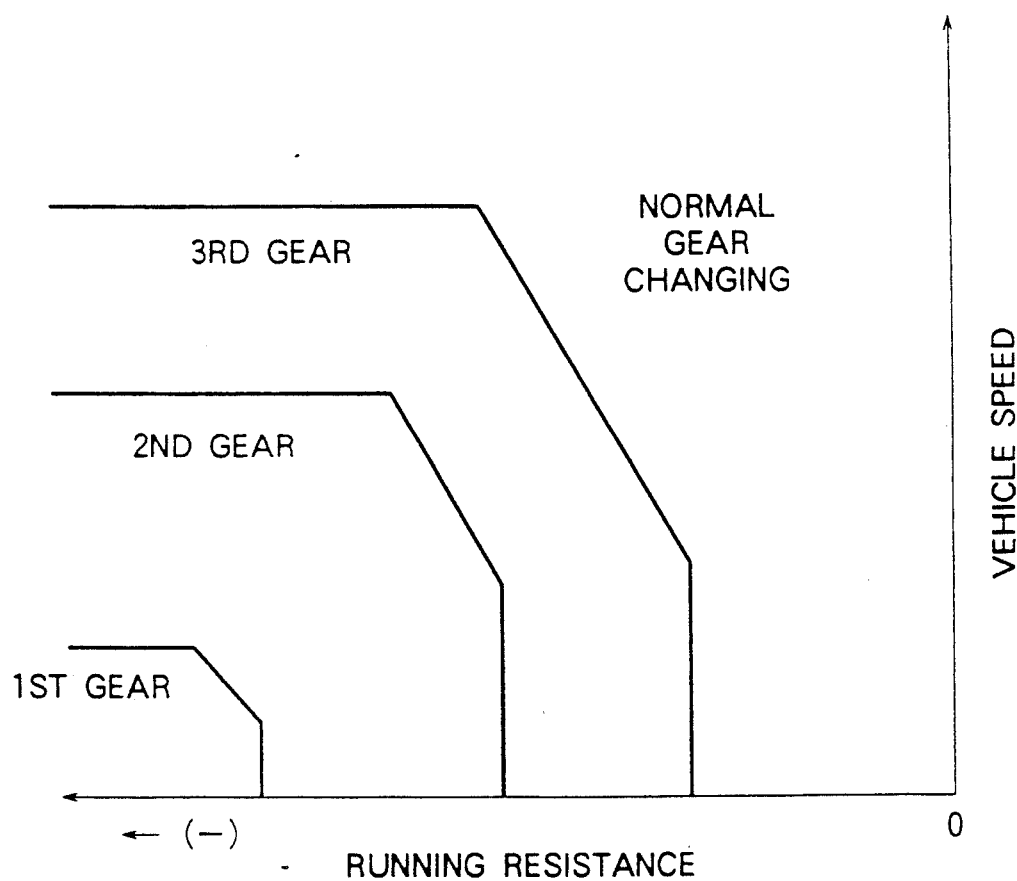
FIG. 5 is a graph of an example of the relationship between the gear position of the transmission, the vehicle speed, and the running resistance for the embodiment of FIG. 1 when operating in the mode illustrated in FIG. 4.

On the other hand, if in Step S28 it is determined that the running resistance is less than the second prescribed value K2, the gear change command unit 10d determines that it is necessary to perform engine braking, and in Step S29 it sends a command to the gear change pattern selector 10a to select a gear suitable for performing engine braking, the gear being determined by the vehicle speed and the running resistance. FIG. 5 illustrates an example of the relationship of the gear selected by the gear change pattern selector 10a when engine braking is to be performed to the running resistance and the vehicle speed. The more negative the running resistance R, the lower the gear that is selected for engine braking. On the other hand, the higher the vehicle speed, the higher the gear that is selected for engine braking, and when the vehicle speed exceeds a certain level, the gear change pattern selector 10a selects a gear change pattern in its usual manner based on the vehicle speed and the throttle opening, regardless of how negative the running resistance is. A relationship like the one shown in FIG. 5 can be stored in a memory table in a memory of the transmission ECU 10, and the gear change pattern selector 10a can perform a look-up operation of the table to determine the appropriate gear using the running resistance and the vehicle speed as input variables.

In Step S31, the solenoid valves 2 are driven by the gear change pattern selector 10a to operate the transmission 1 according to the gear change pattern selected in Step S30 or Step S31, and then Step S22 is returned to.

Thus, in the mode of operation illustrated in FIG. 4, engine braking is automatically performed when the vehicle is travelling downhill and the running resistance becomes more than a certain amount negative, so the vehicle is limited to a safe speed by the engine 3 without the driver having to apply the brakes. As a result, wear on the brakes is decreased, and the danger of brake failure due to overheating on long downhill slopes is eliminated. A transmission control apparatus according to the present invention is therefore particularly advantageous when the vehicle is travelling on mountain roads.

In order to obtain much stronger engine braking, it is possible to cut off the fuel supply to the engine at the same time that the transmission 1 is made to downshift. Furthermore, if the transmission 1 is equipped with a lockup clutch, the effectiveness of engine braking can be increased by engaging the lockup clutch when downshifting is performed so as to directly connect the gear box of the transmission 1 to the engine 3.

In the mode of operation illustrated in FIG. 4, the transmission 1 is automatically made to downshift when the running resistance becomes negative by a certain amount. However, the driver of the vehicle may not wish to slow down the vehicle at this point and may feel comfortable travelling downhill without applying the brakes. Thus, it is not necessary to perform engine braking until the driver of the vehicle actually desires to slow down the vehicle. To prevent engine braking before the driver wishes to decelerate, the transmission ECU 10 can be made responsive to the brakes of the vehicle so as to delay downshifting until the driver applies the brakes, whereby deceleration of the vehicle due to downshifting will coincide with the driver's desire to decelerate. One method of detecting the application of the brakes is shown in FIG. 1, in which a switch 14 is connected to the brake pedal 13 of the vehicle, and the switch 14 provides the transmission ECU 10 with an output signal when the switch 14 is actuated by depression of the brake pedal 13. Other methods can be used to detect the actuation of the brakes, such as sensing when current is flowing through the brake lights of the vehicle.

As an alternative control method, instead of making the transmission 1 downshift, the transmission ECU 10 can prevent the transmission 1 for upshifting on a downhill slope when the running resistance falls below the second prescribed value K2.

Figure 6:
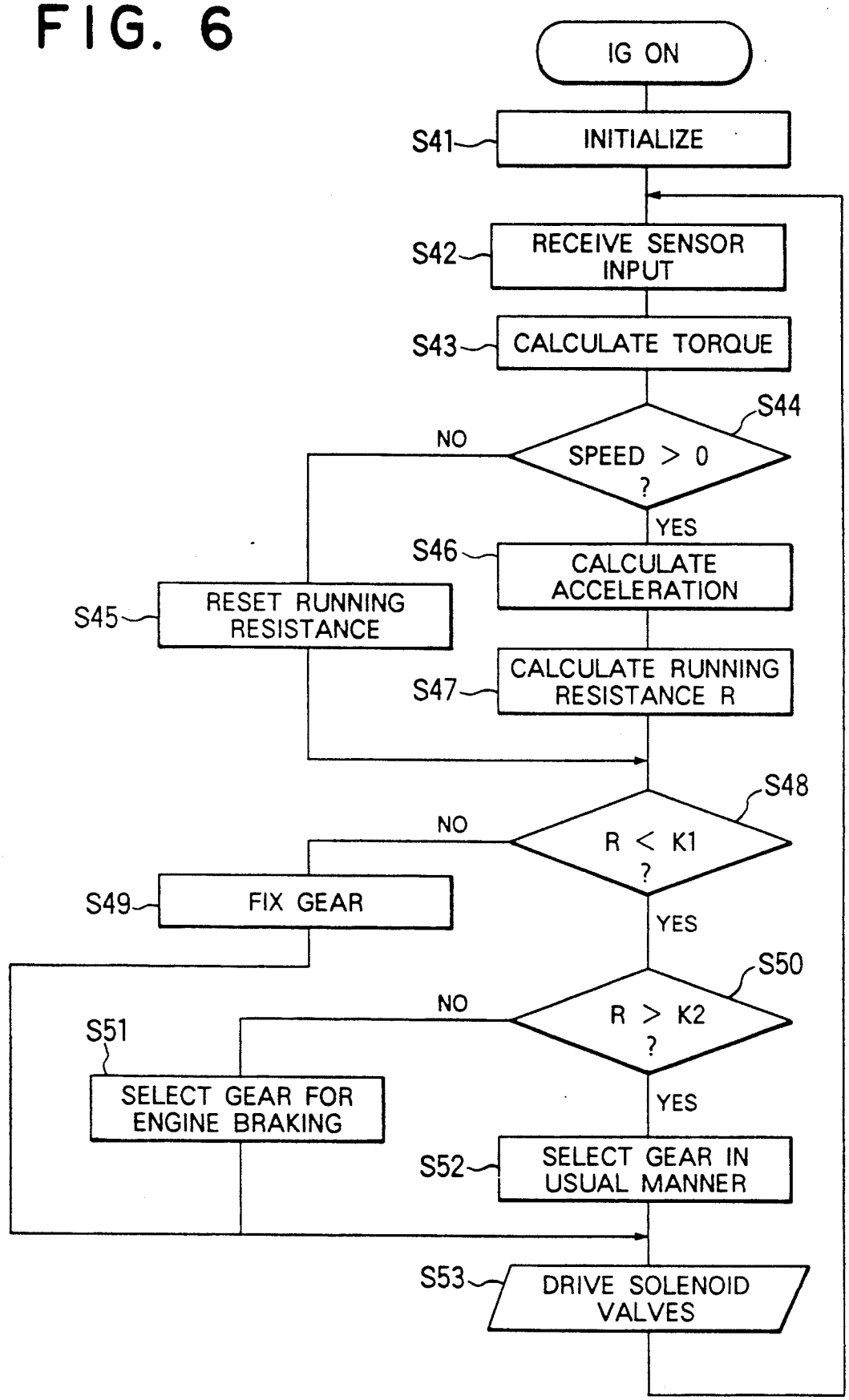
FIG. 6 is a flow chart illustrating another mode of operation of the embodiment of FIG. 1.

A control apparatus according to the present invention can be constructed to operate in either one of the operating modes illustrated in FIG. 3 and FIG. 4, or it can be constructed to operate in both operating modes. FIG. 6 is a flow chart of an operating mode which combines the operating modes of FIGS. 3 and 4. In FIG. 6, Steps S41-S47 are identical to Steps S1-S7, respectively, so the operating mode illustrated in FIG. 4 will be explained beginning with Step S48. In this step, the running resistance R calculated by the running resistance calculator 10c in Step S47 is compared with the first prescribed value K1. If the running resistance R is greater than or equal to K1, then the gear change command unit 10d determines that the vehicle is travelling on an uphill slope, so in Step S49, the gear change command unit 10d generates a command to the gear change pattern selector 10a to fix the transmission 1 in its present gear to prevent upshifting.

On the other hand, if the running resistance is smaller than K1, the gear change command unit 10d determines that it is not necessary to inhibit upshifting, and in Step S50, the running resistance R is compared with the second prescribed value K2. If the rushing resistance is greater than K2, the gear change command unit 10d determines that it is not necessary to perform engine braking, so in Step S52, the gear change pattern selector 10a selects a gear change pattern for the transmission 1 in the usual manner based on the throttle opening and the vehicle speed.

If, however, the running resistance R is less than or equal to K2, the gear change command unit 10d determines that it is necessary to perform engine braking, and in Step S51 it sends a command to the gear change pattern selector 10a to select a gear suitable for performing engine braking using a relationship like that illustrated in FIG. 5.

Next, in Step S53, the solenoid valves 2 are driven by the gear change pattern selector 10a to operate the transmission 1 according to the gear change pattern selected in Step S48, S51, or S52, and then Step S42 is returned to.

The operating mode illustrated in FIG. 6 combines the benefits of the operating modes of FIGS. 3 and 4 and provides both good hill climbing performance on uphill slopes and automatic engine braking on downhill slopes.

What is claimed is:

1. A control apparatus for an automatic transmission of a vehicle comprising:

calculating means for calculating a running resistance of the vehicle;

selecting means for selecting a gear based on a speed of the vehicle and an opening of a throttle valve of the vehicle; and setting means for enabling the selecting means to set the transmission to the selected gear when the running resistance is less than a first value and for preventing the selecting means from upshifting the transmission from the selected gear when the running resistance exceeds the first value, said first value being determined based upon the selected gear of the transmission and corresponds to an uphill slope; wherein the calculating means calculates the running resistance as a function of an engine torque and acceleration of the vehicle.

2. An apparatus as claimed in claim 1 wherein the calculating means calculates the running resistance according to the formula $$R = (T \times G \times 1/r) - a \times m$$

wherein R is the running resistance, T is the torque generated by an engine of the vehicle, G is the gear ratio of the transmission, r is the radius of tires on drive wheels of the vehicle, a is the vehicle acceleration, and m is the vehicle mass.

3. A control apparatus for an automatic transmission of a vehicle comprising:

calculating means for calculating a running resistance of the vehicle;

selecting means for selecting a gear based on a speed of the vehicle and an opening of a throttle valve of the vehicle;

setting means for enabling the selecting means to set the transmission to the selected gear when the running resistance is less than a first value and for preventing the selecting means from upshifting the transmission from the selected gear when the running resistance exceeds the first value, said first value being determined based upon the selected gear of the transmission and corresponds to an uphill slope; and means for downshifting the transmission from the selected gear to a lower gear when the running resistance is less than a second value smaller than the first value and corresponding to a downhill slope.

4. An apparatus as claimed in claim 3 wherein the lower gear is one in which an engine of the vehicle performs engine braking.

5. A control apparatus for an automatic transmission of a vehicle comprising:

calculating means for calculating a running resistance of the vehicle;

selecting means for selecting a gear based on a speed of the vehicle and an opening of a throttle valve of the vehicle; and setting means for enabling the selecting means to set the transmission to the selected gear when the running resistance is greater than a prescribed value and for causing said selecting means to downshift the transmission from the selected gear to a lower gear when the running resistance is less than the prescribed value, wherein the prescribed value is determined based upon the selected gear of the transmission and corresponds to a downhill slope.

6. An apparatus as claimed in claim 5 wherein the lower gear is one in which an engine of the vehicle performs engine braking.

7. An apparatus as claimed in claim 5 further comprising:

a brake sensor for sensing the actuation of brakes of the vehicle; and means responsive to the brake sensor for preventing the transmission from downshifting from the selected gear when the running resistance is less than the prescribed value until the brake sensor senses the actuation of the brakes.

8. An apparatus as claimed in claim 5 wherein the calculating means calculates the running resistance according to the formula $$R = (T \times G \times 1/r) - a \times m$$

wherein R is the running resistance, T is the torque generated by an engine of the vehicle, G is the gear ratio of the transmission, r is the radius of tires on drive wheels of the vehicle, $a$ is the vehicle acceleration, and m is the vehicle mass.

9. A control method for an automatic transmission of a vehicle comprising:

calculating a running resistance of the vehicle;

preventing the transmission from upshifting when the running resistance is greater than a first value which corresponds to an uphill slope and is based upon a selected gear of the transmission; and downshifting the transmission when the running resistance is smaller than a second value that is smaller than the first value which corresponds to a downhill slope and is based upon the selected gear of the transmission.

10. A control method as claimed in claim 9 further comprising selecting a gear based on a degree of opening of a throttle valve of the vehicle and a speed of the vehicle and operating the transmission in the selected gear when the running resistance is less than the first value.

11. A control method as claimed in claim 9 wherein the running resistance is calculated by the formula $$R = (T \times G \times 1/r) - a \times m$$

wherein R is the running resistance, T is the torque generated by an engine of the vehicle, G is the gear ratio of the transmission, r is the radius of tires on drive wheels of the vehicle, $a$ is the vehicle acceleration, and m is the vehicle mass.

12. A control method as claimed in claim 9 wherein the downshifting is to a gear in which engine braking is performed by an engine of the vehicle.

13. A control method as claimed in claim 9 wherein the vehicle is equipped with brakes, further comprising detecting whether the brakes of the vehicle have been applied so that the downshifting is performed only after detecting the application of the brakes.

14. A control method for an automatic transmission of a vehicle comprising:

calculating a running resistance of the vehicle; and downshifting the transmission when the running resistance is smaller than a prescribed value corresponding to a downhill slope, said prescribed value being based upon a selected gear of the transmission.

15. A control method as claimed in claim 14 wherein the downshifting is to a gear in which engine braking is performed by an engine of the vehicle.

16. A control method as claimed in claim 14 further comprising selecting a gear based on the degree of opening of a throttle valve of the vehicle and the speed of the vehicle and operating the transmission in the selected gear when the running resistance is greater than the prescribed value.

17. A control method as claimed in claim 14 wherein the vehicle is equipped with brakes, further comprising detecting whether the brakes of the vehicle have been applied so that the downshifting is preformed only after detecting the application of the brakes.

18. A control method as claimed in claim 14 wherein the running resistance is calculated by the formula $$R = (T \times G \times 1/r) - a \times m$$

wherein R is the running resistance, T is the torque generated by an engine of the vehicle, G is the gear ratio of the transmission, r is the radius of tires on drive wheels of the vehicle, $a$ is the vehicle acceleration, and m is the vehicle mass.

19. A control method for an automatic transmission of a vehicle comprising:

calculating a running resistance of the vehicle;

selecting a gear for the transmission based on a speed of the vehicle and an opening of a throttle valve of the vehicle;

operating the transmission in the selected gear when the running resistance is between a first value and a second value;

preventing the transmission from upshifting from the selected gear when the running resistance exceeds the first value, the first value corresponding to an uphill slope and being based upon the selected gear of the transmission; and downshifting the transmission from the selected gear when the running resistance falls below the second value, the second value corresponding to a downhill slope and being based upon the selected gear of the transmission.

* * * * *